(12) United States Patent
Santilli et al.

(10) Patent No.: US 10,569,621 B2
(45) Date of Patent: Feb. 25, 2020

(54) CASING FOR AIR CONDITIONING UNIT

(71) Applicant: DENSO International America, Inc., Southfield, MI (US)

(72) Inventors: Ercole Santilli, Chesterfield, MI (US); Ross Mischnick, Grosse Pointe Park, MI (US); James Link, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 223 days.

(21) Appl. No.: 15/166,362

(22) Filed: May 27, 2016

(65) Prior Publication Data

US 2017/0341484 A1 Nov. 30, 2017

(51) Int. Cl.
*B60H 1/00* (2006.01)
*B60H 1/32* (2006.01)

(52) U.S. Cl.
CPC ....... *B60H 1/3233* (2013.01); *B60H 1/00028* (2013.01); *B60H 1/00685* (2013.01); *B60H 2001/00085* (2013.01)

(58) Field of Classification Search
CPC ............ B60H 1/00564; B60H 1/00671; B60H 1/3233
USPC ....................................................... 454/143
See application file for complete search history.

(56) References Cited

U.S. PATENT DOCUMENTS

| | | | |
|---|---|---|---|
| 4,604,873 A | * | 8/1986 | Ohashi ................. B60H 1/0005 62/158 |
| 8,342,922 B2 | | 1/2013 | Deneau et al. |
| 8,663,351 B2 | | 3/2014 | Koch |
| 9,776,474 B2 | * | 10/2017 | Kume .................... F24F 13/222 |
| 2004/0083747 A1 | * | 5/2004 | Shichiken .......... B60H 1/00514 62/244 |
| 2006/0064991 A1 | | 3/2006 | Kozak et al. |
| 2011/0005720 A1 | * | 1/2011 | Seto ................... B60H 1/00064 165/71 |
| 2014/0157803 A1 | | 6/2014 | Pebley et al. |
| 2015/0013372 A1 | * | 1/2015 | Harke ..................... B60H 1/28 62/291 |
| 2015/0251516 A1 | * | 9/2015 | Mazzocco ............ B60H 1/3233 62/244 |

* cited by examiner

*Primary Examiner* — Grant Moubry
*Assistant Examiner* — Ryan L Faulkner

(57) ABSTRACT

The present disclosure provides a casing for an air conditioning unit including a main body, a door, a passing defining member, and a drain channel. The main body includes a fresh-air passage and a recirculation-air passage. The recirculation-air passage is positioned below the fresh-air passage. The door selectively opens and closes a communication hole through which the fresh-air passage and the recirculation-air passage are in fluid communication with each other. The passage defining member is disposed upstream of the communication hole and defines a lower side of the fresh-air passage. The drain channel extends from the passage defining member to a space outside of the recirculation-air passage to discharge condensed water generated in the fresh-air passage.

6 Claims, 3 Drawing Sheets

TO VEHICLE INTERIOR

CASING FOR AIR CONDITIONING UNIT

FIELD

The present disclosure relates to a casing for an air conditioning unit.

BACKGROUND

This section provides background information related to the present disclosure which is not necessarily prior art.

Vehicles are known to incorporate a heating, ventilation, and air conditioning (HVAC) systems to improve the comfort of the people within the vehicle interior. The HVAC systems heat and cool air blown through an air conditioning unit (HVAC unit) using a heating heat exchanger and/or a cooling heat exchanger.

Such a HVAC unit may include a casing defining a fresh-air passage and a recirculation-air passage therein, and the recirculation-air passage may be positioned below the fresh-air passage. In such a configuration, the two passages may be in fluid communication with each other through a communication hole. At least one door is disposed inside the casing to selectively open and close the communication hole in accordance with air conditioning modes of the HVAC unit.

In a fresh-air mode, fresh air is drawn into the fresh-air passage from the outside of a vehicle to introduce the fresh air into a vehicle interior. In such an operation, when fresh-air drawn from an outside of a vehicle is cooled inside the fresh-air passage, water may be generated inside the fresh-air passage due to condensation. In this case, even if the door closes the communication hole, the condensed water may leak through a space between the door and an edge of the communication hole, which may bring undesirable results, such as leaking of water into the vehicle interior.

SUMMARY

This section provides a general summary of the disclosure, and is not a comprehensive disclosure of its full scope or all of its features.

The present disclosure provides a casing for an air conditioning unit. The casing includes a main body, a door, a passage defining member, and a drain channel. The main body includes a fresh-air passage and a recirculation-air passage. The recirculation-air passage is positioned below the fresh-air passage. The door selectively opens and closes a communication hole through which the fresh-air passage and the recirculation-air passage are in fluid communication with each other. The passage defining member is disposed upstream of the communication hole and defines a lower side of the fresh-air passage. The drain channel extends from the passage defining member to a space outside of the recirculation-air passage to discharge condensed water generated in the fresh-air passage.

The present disclosure further provides an air conditioning unit. The air conditioning unit includes a casing, a door, a passage defining member, and a drain channel. The casing includes a fresh-air passage and a recirculation-air passage. The recirculation-air passage is positioned below the fresh-air passage. The door selectively opens and closes a communication hole through which the fresh-air passage and the recirculation-air passage are in fluid communication with each other. The passage defining member is disposed upstream of the communication hole and defines a lower side of the fresh-air passage. The drain channel extends from the passage defining member to a space outside of the recirculation-air passage to discharge condensed water generated in the fresh-air passage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
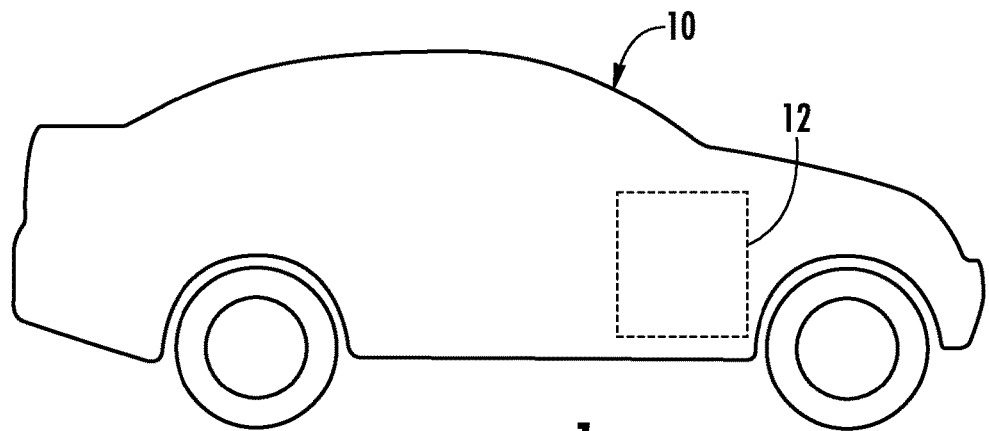
FIG. 1 is a side view of a vehicle with a HVAC unit in accordance with a present disclosure.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

With reference to FIG. 1, a vehicle 10 incorporating a HVAC unit (air conditioning unit) 12 in accordance with the present disclosure is illustrated. The HVAC unit 12 is typically disposed within a dashboard of the vehicle 10 and either cools or warms air flowing through the HVAC unit 12. In order to cool the air, the HVAC unit 12 houses an evaporator, whereas, in order to heat the air, the HVAC unit 12 houses a heating heat exchanger, both of which are not illustrated.

The HVAC unit 12 generally includes a casing 14, a blower 16, and a housing 18. The HVAC unit 12 also includes a servo motor (not shown) attached to the casing 14. The housing 18 is connected to the casing 14 at the bottom side of the casing 14. The housing 18 defines an inside space (space) 18a (see FIG. 5) to house the blower 16. The blower 16 generates a negative pressure in the inside space 18a of the housing 18 to draw air into the casing 14.

Figure 2:
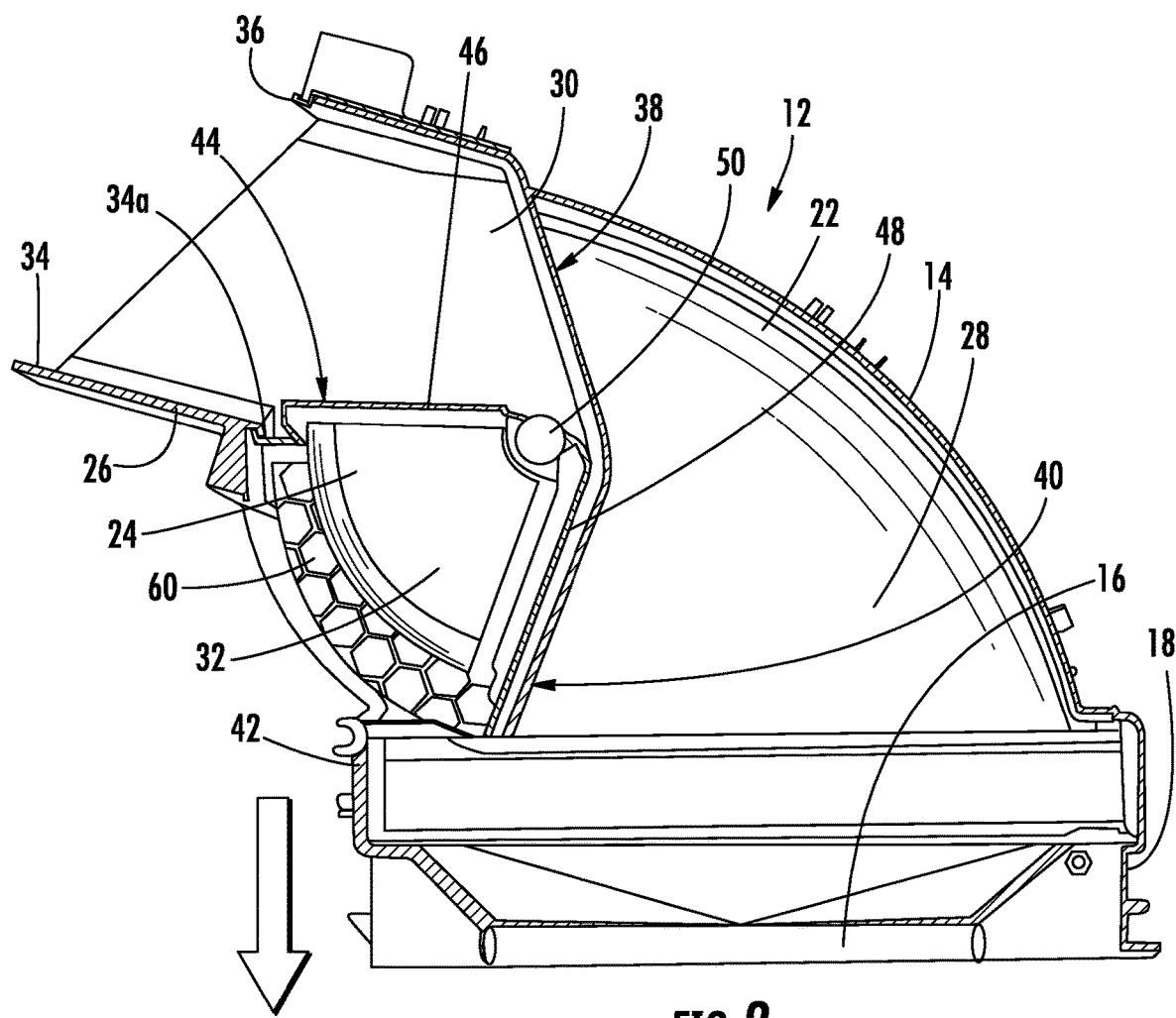
FIG. 2 is a cross-sectional view of the HVAC unit illustrated in FIG. 1.

The casing 14 generally includes a main body 22, a door 24, and an inlet frame 26. The main body 22 is formed to define an internal space therein that is in fluid communication with the inside space 18a of the housing 18. The internal space is further defined into a main passage 28, a fresh-air passage 30, and a recirculation-air passage 32. More specifically, the recirculation-air passage 32 is generally defined by the inlet frame 26 that is attached to the main body 22. The inlet frame 26 includes a bottom plate (passage defining member) 34 and defines a fresh-air inlet 36 that is in fluid communication with an outside of the vehicle 10. The fresh-air is drawn into the inlet frame 26 (the fresh-air passage 30) through the fresh-air inlet 36. As shown in FIG. 2, the bottom plate 34 protrudes from the main body 22 and defines a lower side of the fresh-air passage 30. The fresh-air passage 30 is in fluid communication with the main passage 28 through a first opening 38 formed inside the casing 14.

The recirculation-air passage 32 is positioned below the fresh-air passage 30 and is in fluid communication with the main passage 28 through a second opening 40 formed inside the casing 14. The main body 22 further defines a recirculation-air inlet 42. The recirculation-air inlet 42 is in communication with a vehicle interior through a duct (not shown). Thus, air supplied to the vehicle interior is drawn into the recirculation-air passage 32 through the recirculation-air inlet 42, and then the air is supplied into the vehicle interior again.

Figure 4:
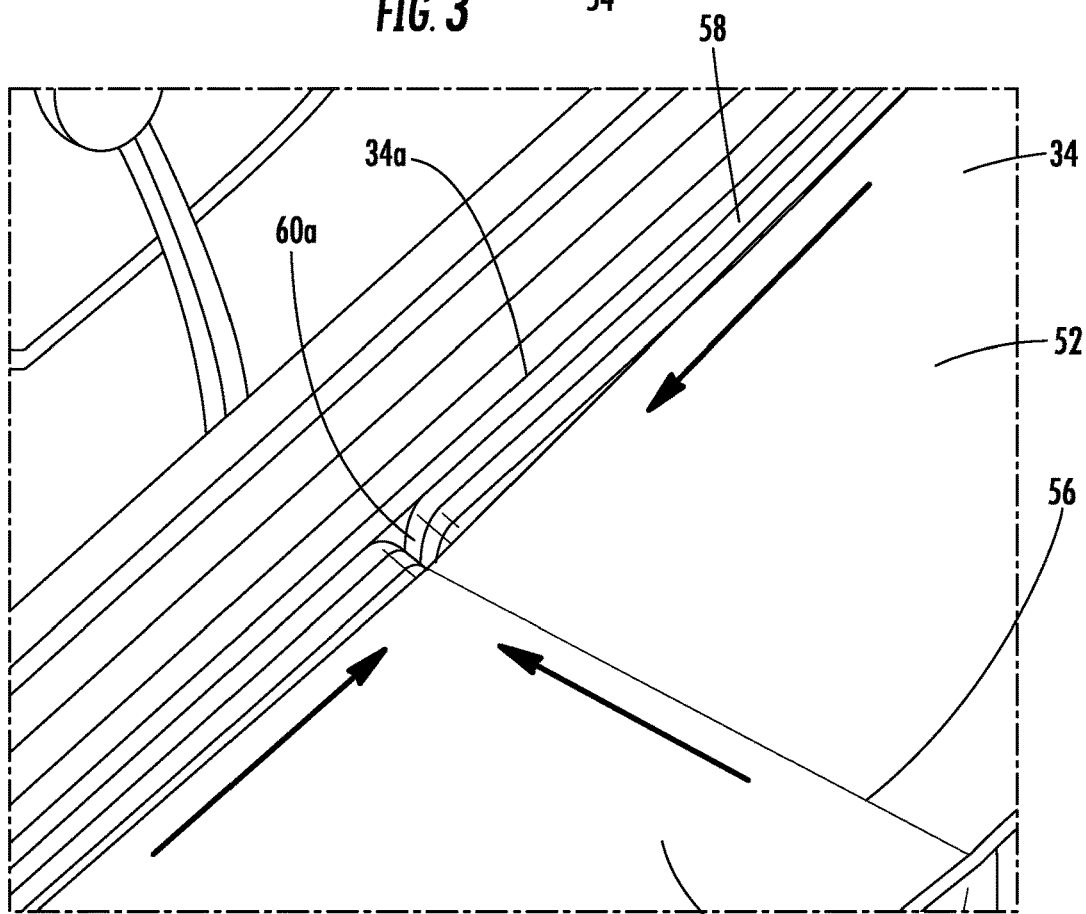
FIG. 4 is an exploded perspective view of the HVAC unit indicated by the reference mark A.

As shown in FIG. 2, the fresh-air passage 30 and the recirculation-air passage 32 are in fluid communication with each other through a third opening (communication hole) 44 that is selectively opened and closed by the door 24. As shown in FIGS. 2 and 4, the bottom plate 34 of the inlet frame 26 has a downstream side portion 34a that defines an upstream side edge of the third opening 44. The upstream side edge of the third opening 44 (i.e., the downstream side portion 34a of the inlet frame 26) is shifted relative to the housing 18 toward the upstream side in the fresh-air flow direction. The door 24 includes a first plate 46 and a second plate 48, each of which is connected to a rotational shaft 50. The door 24 is disposed in the main body 22 and configured to be rotatable about the rotational shaft 50. One end of the rotational shaft 50 is mechanically connected to a driving shaft (not shown) of the servo motor. Thus, the door 24 is rotated by the servo motor about the rotational shaft 50.

In this embodiment, the servo motor rotates the door 24 between a first position and a second position. In the first position, the first plate 46 closes the first opening 38 and the second plate 48 closes the third opening 44, while the second opening 40 being open. Therefore, the recirculation air is allowed to flow through the recirculation-air passage 32. That is, the door 24 is maintained at the first position during the recirculation mode.

As shown in FIG. 2, in the second position, the first plate 46 closes the third opening 44 and the second plate 48 closes the second opening 40, while the first opening 38 being open. Thus, fresh air is allowed to flow through the fresh-air passage 30. That is, the door 24 is maintained at the second position during the fresh-air mode.

When the door 24 is in the first position, the distal end of the second plate 48 contacts the downstream side portion 34a of the inlet frame 26. In contrast, when the door 24 is in the second position, the distal end of the first plate 46 contacts the downstream side portion 34a of the inlet frame 26.

Figure 3:
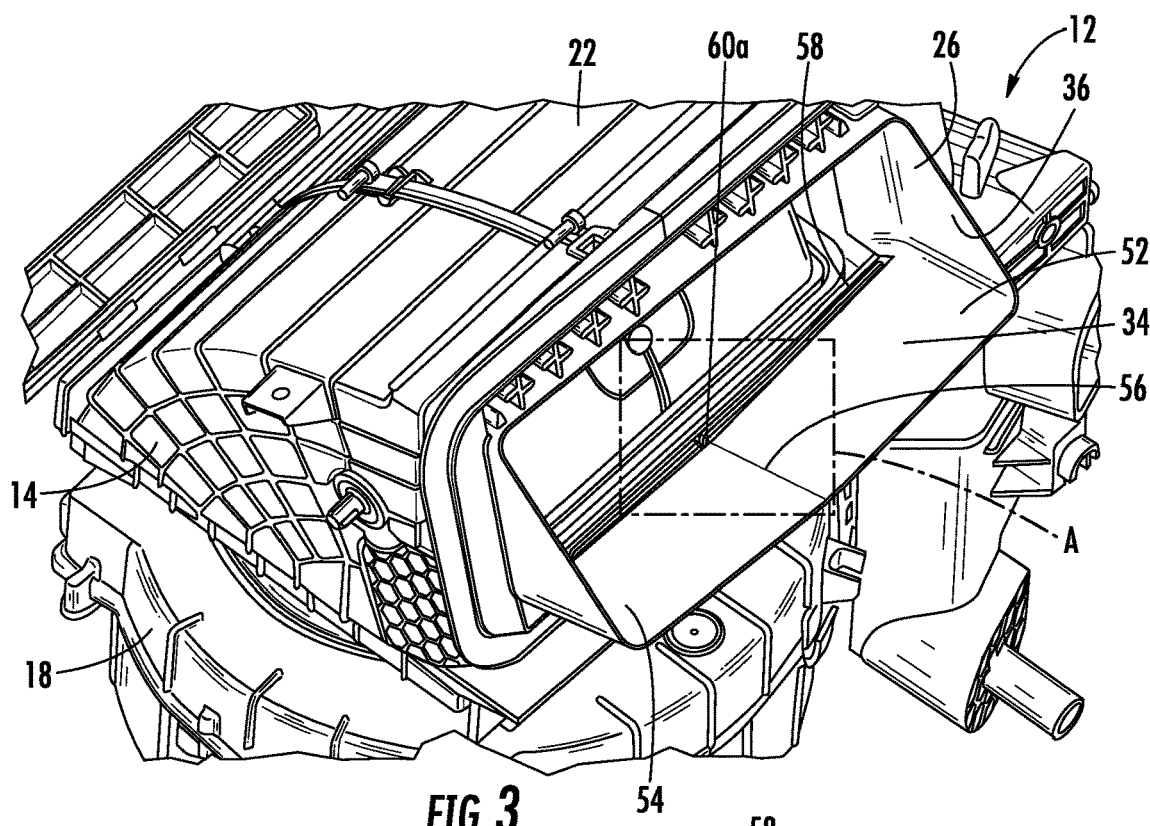
FIG. 3 is a perspective view of the HVAC unit.

As shown in FIG. 3, the bottom plate 34 of the inlet frame 26 has an elongated shape and includes declining surface. The declining surface further includes a first portion 52 and a second portion 54 that are connected to each other at a connection line 56. Both the first portion 52 and the second portion 54 downwardly decline toward the connection line 56. In other words, the first portion 52 and the second portion 54 decline toward each other. Furthermore, both the first portion 52 and the second portion 54 downwardly decline toward the third opening 44, as shown in FIG. 2.

As shown in FIG. 4, a groove 58 is formed in the bottom plate 34. The groove 58 extends along the downstream side portion 34a of the bottom plate 34, i.e., along the upstream side edge of the third opening 44. In other words, the groove 58 exists at a position close to, and upstream of, the upstream side edge of the third opening 44.

Figure 5:
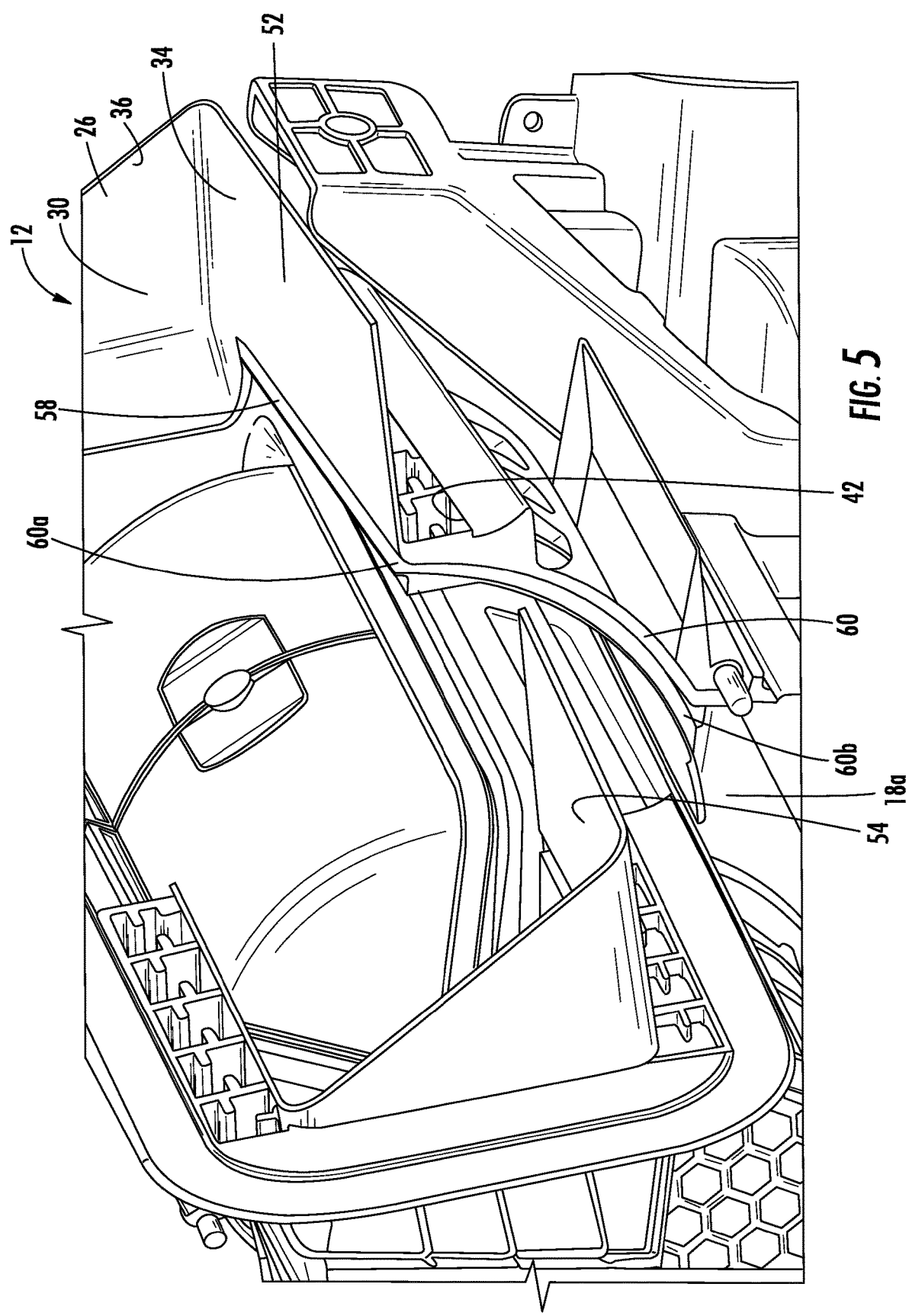
FIG. 5 is a partially cross-sectional view of the HVAC.

The casing 14 further includes a drain channel 60. As shown in FIG. 5, the drain channel 60 extends from the bottom plate 34 to the inside space 18a of the housing 18 in a curved line. Moreover, the drain channel 60 extends along and in front of the recirculation-air inlet 42. The drain channel 60 includes an inlet 60a that is open on the bottom plate 34. More specifically, the inlet 60a of the drain channel 60 is open at the groove 58 as shown in FIG. 4. The connection line 56 of the bottom plate 34 extends to the inlet 60a of the drain channel 60. Furthermore, the connection line 56 declines toward the inlet 60a of the drain channel 60. That is, the first portion 52 and the second portion 54 decline toward the connection line 56 and the connection line 56 declines toward the inlet 60a of the drain channel 60.

The outlet 60b of the drain channel 60 exists in the inside space 18a of the housing 18 (see FIG. 5). Hence, the fresh-air passage 30 and the inside space 18a of the housing 18 are in fluid communication with each other through the drain channel 60. A sump (not shown) is disposed inside the housing 18 and the outlet 60b of the drain channel 60 is open toward the sump.

Next, the operation of the HVAC unit 12 will be described below. For example, in the fresh-air mode, the servo motor rotates the door 24 to the second position. The distal end of the first plate 46 of the door 24 contacts the downstream side portion 34a of the inlet frame 26 to close the third opening 44. When the blower 16 is energized, negative pressure is generated in the inside space 18a of the housing 18. Due to the negative pressure, fresh-air is drawn from the fresh-air inlet 36, and then the fresh-air flows through the fresh-air passage 30 and the main passage 28. As a result, the fresh-air is supplied into the vehicle interior.

In this case, when there is a temperature difference between the fresh-air and the inlet frame 26 and when the fresh-air is cooled with the inlet frame 26, condensation of water vapor inside the fresh-air may occur in the fresh-air passage 30. As a result, the water vapor in the fresh-air condenses to form droplets (condensed water) in the fresh-air passage 30. However, even if the droplets are generated in the fresh-air passage 30, the fresh-air can be discharged by the drain channel 60 without leaking through the third opening 44 according to the present embodiment.

As shown in FIG. 4, some of the droplets are guided with the first portion 52 and the second portion 54 of the declining surface of the bottom plate 34 toward the connection line 56. Furthermore, the first portion 52 and the second portion 54 (i.e., the declining surface) also decline to the groove 58, and thus some of the droplets are guided to the groove 58. When the droplets reach to the connection line 56, the droplets are guided along the connection line 56 toward the inlet 60a of the drain channel 60. Similarly, when the droplets reach to the groove 58, the droplets are guided toward the inlet 60a of the drain channel 60 along the groove 58. Then, the droplets are drawn into the drain channel 60 and discharged from the bottom plate 34 to the inside space 18a of the housing 18 through the drain channel 60.

As described above, the drain channel 60 is in fluid communication with the inside space 18a in which the negative pressure is generated due to the blower 16. Therefore, the droplets on the bottom plate 34 are forcibly drawn into the inlet 60a of the drain channel 60. The droplets are eventually discharged through the outlet 60b of the drain channel 60 and stored inside the sump. As described above, the droplets condensed in the fresh-air passage 30 are drawn into the inlet 60a of the drain channel 60 and are discharged from the fresh-air passage 30 to the inside space 18a of the hosing before reaching to the third opening 44. Therefore, the droplets can be prohibited from leaking into a space between the downstream side portion 34a of the inlet frame 26 and the distal end of the first plate 46 of the door 24. As a result, it is possible to prohibit the droplets from leaking into an undesirable space, such as the vehicle interior, through the third opening 44.

The declining surface of the bottom plate 34 declines toward the inlet 60a of the drain channel 60, and therefore the droplets can be smoothly guided toward the inlet 60a of the drain channel 60. Furthermore, since the drain channel 60 is in fluid communication with the inside space 18a of the housing 18 having a negative pressure, the droplets can be more effectively guided toward the inlet 60a of the drain channel 60.

It should be noted that the operation and effects according to the above-described configuration can be applied to the recirculation-air mode. That is, even if droplets are condensed inside the fresh-air passage 30 during the recirculation-air mode, the droplets can be discharged from the fresh-air passage 30 through the drain channel 60. Therefore, the leaking of the droplets into an undesirable space, such as the vehicle interior, can be also prohibited during the recirculation-air mode.

Modifications to the Embodiment

Although the declining surface includes the first portion 52 and the second portion 54 in the above-described embodiment, the declining surface may be formed of a single surface. The single surface may downwardly decline toward one side end of the bottom plate 34 in an elongated direction of the bottom plate 34. The single surface also declines toward the groove 58 (first groove). In this case, the connection line 56 described in the embodiment may be eliminated. Furthermore, an additional groove (unillustrated second groove) can be formed along the one side end of the bottom plate 34. The inlet 60a of the drain channel 60 can be formed at the connection point of the first groove 58 and the second groove. The second groove is formed to decline toward the inlet 60a of the drain channel 60.

In the above-described embodiment, the drain channel 60 extends along and in front of the recirculation-air inlet 42 to the inside space 18a of the housing 18. However, the drain channel 60 may extend in a different manner from the embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A casing for an air conditioning unit for a vehicle, comprising:
   a main body that includes a fresh-air passage and a recirculation-air passage, the recirculation-air passage being positioned below the fresh-air passage;
   a door that selectively opens and closes a communication hole through which the fresh-air passage and the recirculation-air passage are in fluid communication with each other;
   a passage defining member that is disposed upstream of the communication hole and defines a lower side of the fresh-air passage; and
   a drain channel that extends from the passage defining member to a space outside of the recirculation-air passage to discharge condensed water generated in the fresh-air passage, wherein
   the space is defined by a housing that houses a blower in the space,
   the drain channel includes an inlet that is open on the passage defining member and an outlet that is open in the space,
   the condensed water generated in the fresh-air passage is drawn from the passage defining member to the space through the drain channel by negative pressure generated by the blower,
   the passage defining member is a bottom plate of an inlet frame defining a fresh-air inlet through which a fresh-air from an outside of the vehicle introduced into the main body,
   the passage defining member includes a declining surface that declines toward the inlet of the drain channel,
   the declining surface includes a first portion and a second portion facing each other along a first direction,
   the first portion has a first side and a second side facing each other along the first direction,
   the second portion has a first side and a second side facing each other along the first direction,
   the second side of the first portion and the second side of the second portion are connected to each other at a connection line that extends to the inlet of the drain channel along a second direction intersecting with the first direction, and
   each of the first portion and the second portion declines toward the connection line with the respective first side located above the respective second side along a third direction perpendicular to both of the first direction and the second direction.

2. The casing according to claim 1, wherein the passage defining member includes a groove that guides condensed water toward the inlet of the drain channel.

3. The casing according to claim 2, wherein the passage defining member defines an upstream side edge of the communication hole, and the groove extends along the upstream side edge of the communication hole.

4. An air conditioning unit for a vehicle, comprising:
a casing that includes a fresh-air passage and a recirculation-air passage, the recirculation-air passage being positioned below the fresh-air passage;
a housing that is connected to the casing and defines a space therein;
a blower that is housed in the space of the housing and generates negative pressure in the space;
a door that selectively opens and closes a communication hole through which the fresh-air passage and the recirculation-air passage are in fluid communication with each other;
a passage defining member that is disposed upstream of the communication hole and defines a lower side of the fresh-air passage; and
a drain channel that extends from the passage defining member to the space of the housing to discharge condensed water generated in the fresh-air passage, wherein
the condensed water generated in the fresh-air passage is drawn from the passage defining member to the space through the drain channel by negative pressure generated by the blower,
the passage defining member is a bottom plate of an inlet frame defining a fresh-air inlet through which a fresh air is introduced from an outside of the vehicle into the housing,
the passage defining member includes a declining surface that declines toward the inlet of the drain channel,
the declining surface includes a first portion and a second portion facing each other along a first direction,
the first portion has a first side and a second side facing each other along the first direction,
the second portion has a first side and a second side facing each other along the first direction,
the second side of the first portion and the second side of the second portion are connected to each other at a connection line that extends to the inlet of the drain channel along a second direction intersecting with the first direction, and
each of the first portion and the second portion declines toward the connection line with the respective first side located above the respective second side along a third direction perpendicular to both of the first direction and the second direction.

5. The air conditioning unit according to claim 4, wherein the passage defining member includes a groove that guides condensed water toward the inlet of the drain channel.

6. The air condition unit according to claim 5, wherein the passage defining member defines an upstream side edge of the communication hole, and the groove extends along the upstream side edge of the communication hole.

* * * * *